United States Patent [19]
Zarzalis et al.

[11] Patent Number: 5,473,882
[45] Date of Patent: Dec. 12, 1995

[54] COMBUSTION APPARATUS FOR A GAS TURBINE HAVING SEPARATE COMBUSTION AND VAPORIZATION ZONES

[75] Inventors: Nikolaos Zarzalis, Dachau; Thomas Ripplinger, Vierkirchen, both of Germany

[73] Assignee: MTU Motoren-Und Turbinen-Union München GmbH, München, Germany

[21] Appl. No.: 249,284

[22] Filed: May 25, 1994

[30] Foreign Application Priority Data

Jun. 3, 1993 [DE] Germany .......................... 43 18 405.7

[51] Int. Cl.$^6$ ........................................ F23R 3/34
[52] U.S. Cl. ..................... 60/39.06; 60/733; 60/737
[58] Field of Search ........................ 60/737, 733, 747, 60/39.36, 39.02, 39.06, 748

[56] References Cited

U.S. PATENT DOCUMENTS

| | | | |
|---|---|---|---|
| 4,168,609 | 9/1979 | Greenberg et al. | |
| 4,192,139 | 3/1980 | Buchheim | |
| 4,194,358 | 3/1980 | Stenger | 60/39.36 |
| 4,246,758 | 1/1981 | Caruel et al. | 60/747 |
| 4,412,414 | 11/1983 | Novick et al. | 60/737 |
| 5,197,278 | 3/1993 | Sabla et al. | 60/39.02 |
| 5,220,795 | 6/1993 | Dodds et al. | 60/747 |
| 5,295,354 | 3/1994 | Barbier et al. | 60/733 |

FOREIGN PATENT DOCUMENTS

| | | |
|---|---|---|
| 0542044 | 5/1993 | European Pat. Off. . |
| 2629761 | 1/1978 | Germany . |
| 2826699 | 1/1979 | Germany . |
| 2901099 | 7/1979 | Germany . |
| 0047928 | 3/1983 | Japan ........................ 60/747 |
| 2113769 | 10/1983 | United Kingdom . |

Primary Examiner—Timothy S. Thorpe
Attorney, Agent, or Firm—Ladas & Parry

[57] ABSTRACT

A combustion chamber apparatus 1 for a gas turbine has a pilot stage and a main stage for low-emission lean-burn operation. The pilot stage is separate from the main stage and is formed by a flame tube 2 with an upstream first fuel injector 3a and with a secondary combustion zone 7a. The main stage includes a vaporization chamber 4 and a combustion chamber 5, and a second fuel injector 3b is provided at an upstream end of the vaporization chamber 4. The vaporization chamber 4 produces a homogenous fuel-air mixture which will not burn until it is in the combustion chamber 5. In lean-burn operation of the apparatus, the separate arrangement of the two chambers 4, 5 significantly reduces the formation of nitrogen oxides. For use in aircraft gas turbine engines, the apparatus has an annular shape with several main and pilot stages.

21 Claims, 5 Drawing Sheets

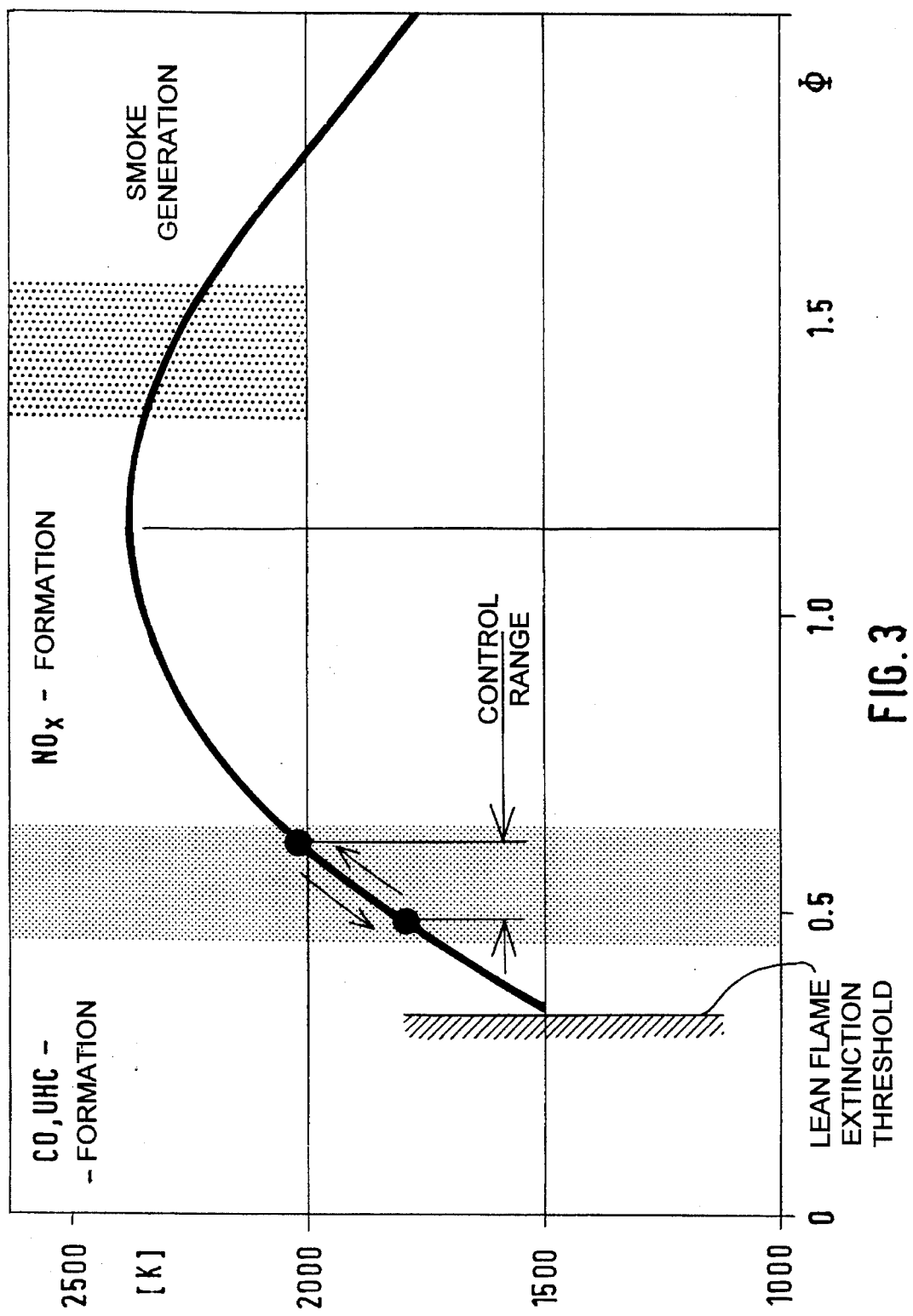

5,473,882

COMBUSTION APPARATUS FOR A GAS TURBINE HAVING SEPARATE COMBUSTION AND VAPORIZATION ZONES

FIELD OF THE INVENTION

This invention relates to combustion apparatus for a gas turbine having a flame tube and separate combustion and vaporization zones, where the flame tube includes a secondary combustion zone with an upstream fuel injection means.

BACKGROUND AND PRIOR ART

Pollutant emission studies on aircraft propulsion systems have shown that pollutants are emitted in climatically highly sensitive regions of the atmosphere. Accordingly, attention has long been directed increasingly to pollutant reduction. Apart from the optimization potential of such major turbine engine components as the compressor, turbine and exhaust nozzle, it is the combustion chamber which still has considerable potential for reducing pollutants, especially nitrogen oxides, produced during combustion. Basically, there are three options to lower gas turbine pollutant emission: use an environmentally more beneficial fuel, lower the specific fuel consumption, and modify the combustion process. The first of these approaches requires a highly complex, novel fuel infrastructure, and reduction of fuel consumption is currently being tackled by optimizing the above-cited components. Attempts to modify the combustion process, finally, gave rise to two different concepts. In accordance with one of these concepts, known as the rich-burn lean-burn variation, the operating point in a primary combustion zone of the combustion chamber is shifted towards the rich-burn mixture, and a second lean-burn stage is arranged downstream of the primary rich-burn stage. Greater potential still for the reduction of nitrogen oxide emissions is the lean-burn concept, where the fuel is burned in a primary combustion zone with excess air. This places the combustion chamber operating point in a lean-mixture region with notably reduced pollutant formation. If nitrogen oxide formation is to be prevented, a homogenous combustion mixture is an essential requirement. With previously implemented combustion chamber concepts featuring separate rich-burn primary and secondary combustion zones, the fuel is injected directly—without premixing—into the primary combustion zone and is mixed thereat. It nevertheless runs the risk of igniting before the mixing process is complete. This locally produces so-called hot pockets of aggravated nitrogen oxide formation. In the prevaporizing lean-burn concept there is an added risk—if the flame does not stabilize sufficiently—of spontaneous ignition in the prevaporizer. This may damage, if not destroy, the combustion chamber.

SUMMARY OF THE INVENTION

An object of the present invention is to provide a combustion chamber construction having separate combustion and vaporization zones, where lean fuel combustion is used to lower pollutant emission and especially nitrogen oxide formation while eliminating the risk of spontaneous ignition in the vaporization zone.

It is a particular object of the present invention to provide a primary combustion zone and a primary vaporization zone each in a separate chamber arranged outside the flame tube, where the vaporizing chamber connects to the combustion chamber and the combustion chamber connects to the flame tube downstream of a fuel injection means in the flame tube.

The arrangement according to the invention provides the advantage that combustion in the primary and secondary combustion zones can be effected with different fuel-air mixtures, so that the rated-load operating point, or with aircraft gas turbines, the cruise operating point, of the primary combustion zone is conducted in ranges where nitrogen oxide formation is low, whereas the secondary combustion zone in the flame tube can be operated with a richer mixture to make sure the combustion chamber operates at an optimum efficiency, especially with regard to aircraft take-off capability and throttled-down operation of aircraft gas turbines. The physically separate arrangement of primary and secondary combustion zones in a main stage and a pilot stage, respectively, allows the selective operation of both combustion zones concurrently or of only a single zone to suit the gas turbine throttle setting, which gives the engine wide latitude of control. External premixing and prevaporization of the fuel for the primary combustion zone in a vaporization chamber set apart from the combustion chamber produces a homogenous fuel-air mixture that does not burn until it is in the combustion chamber. Separation of the two chambers prevents the formation of local hot pockets conducive to nitrogen oxide formation, so that nitrogen oxide emission is minimal.

In a preferred embodiment of the present invention, the combustion chamber has an essentially axisymmetrical shape at least in the primary combustion zone, where for generating a swirling within the primary combustion zone, the vaporization chamber discharges eccentrically into the combustion chamber. This imparts a whirling or swirling motion to the fuel-air mixture as it enters the primary combustion zone from the vaporization chamber to ensure stable combustion in the primary combustion zone. The flow through the vaporization chamber is rectilinear and free from whirls and its velocity is high, so that flashback is largely prevented. The axisymmetrical shape of the combustion chamber supports the aerodynamic formation of whirling in the primary combustion zone to stabilize the flame without the use of additional baffles to serve as flame holders. The combustion chamber is additionally given a conical flare towards the flame tube to promote the formation of turbulence and thus the mixing of the combustion mixture in the primary combustion zone for improved flame stabilization.

To improve the formation of the mixture in the vaporization chamber, the flow through the primary vaporization zone is essentially free from whirls to minimize wall wetting. The intention is to achieve a predominantly drop-type vaporization for a more effective vaporization process for minimum vaporization chamber size as compared to film-type vaporization near the wall. For this purpose, the vaporization chamber is preferably of rectilinear shape. The flow inside the vaporization chamber is made to follow the longitudinal axis of the vaporization chamber.

Admission of air to the primary vaporization chamber is optimal when the direction of flow within the vaporization chamber is approximately parallel to the longitudinal axis of the combustion chamber and the flame tube, respectively.

For fuel admission, the vaporization chamber preferably has a fuel injection means at its upstream end.

Fuel vaporization is further improved by forming the fuel injection means of the vaporization chamber and/or flame tube in the shape of air atomizer nozzles.

For added safety to protect against the hazard of destruction of the combustion chamber in the event of flashback due to spontaneous ignition, the present invention provides the vaporization chamber with circumferentially arranged air inlet ports for cooling the wall of the vaporization chamber, so that occasional flashback will be tolerable.

Further advantageous aspects of the combustion chamber arrangement of the present invention include compactness of design for aircraft turbine applications and high combustion efficiency.

Another precaution used to prevent spontaneous ignition in the vaporization chamber also at elevated pressures and combustion chamber inlet temperatures is to adapt the length of the vaporization chambers to suit the velocity of the flow therethrough such that the dwell time of a fluid particle in the vaporization chamber is less than would permit spontaneous ignition.

The fuel injection means preferably comprises air atomizer nozzles to produce maximally homogenous vaporization in the incoming air.

In order to achieve low emission and wide control range for the combustion chamber, and for cooling the combustion chamber walls, the air mass flows are distributed to the pilot and main stages respectively in the ratios of ⅓ and ⅔ the total air mass flow.

More particularly, about 25% of the air mass flow supplied to the combustion chamber apparatus is supplied to the secondary combustion zone, about 55% to the primary combustion zone and about 20% for cooling purposes.

The invention also contemplates a method of combustion of fuel-air mixtures for a gas turbine comprising:

vaporizing a lean fuel-air mixture in a vaporization chamber, supplying the vaporized fuel-air mixture from the vaporization chamber to a separate main combustion chamber, effecting combustion of the fuel-air mixture in the main combustion chamber, supplying combustion product from the main combustion chamber to a flame tube, supplying a second fuel-air mixture to the flame tube which is richer than the mixture supplied to the main combustion chamber, and effecting combustion in said flame tube in a secondary combustion zone therein, the combustion products from the combustion chamber being supplied to said secondary combustion zone of said flame tube upstream of a fuel injection means in the flame tube.

In accordance with the method of the invention the vaporized fuel-air mixture which is supplied to the main combustion chamber is caused to undergo a rotational swirling movement in the combustion chamber.

In further accordance with the method of the invention, the fuel-air mixture is supplied to the vaporization chamber so that the mixture flows substantially rectilinearly in the vaporization chamber towards the combustion chamber and eccentrically into said combustion chamber.

BRIEF DESCRIPTION OF THE FIGURES OF THE DRAWING

FIG. 1b is a view seen in the direction of arrow 1b in FIG. 1a.

FIG. 1c is a view of the combustion chamber seen in the direction of arrow 1c in FIG. 1a.

FIG. 2b is a view on enlarged scale seen in the direction of arrow 2b in FIG. 2a.

FIG. 3 is a graph showing combustion chamber temperature versus equivalence ratio $\Phi$ in the primary combustion zone.

DETAILED DESCRIPTION OF PREFERRED EMBODIMENTS

Figure 1A:
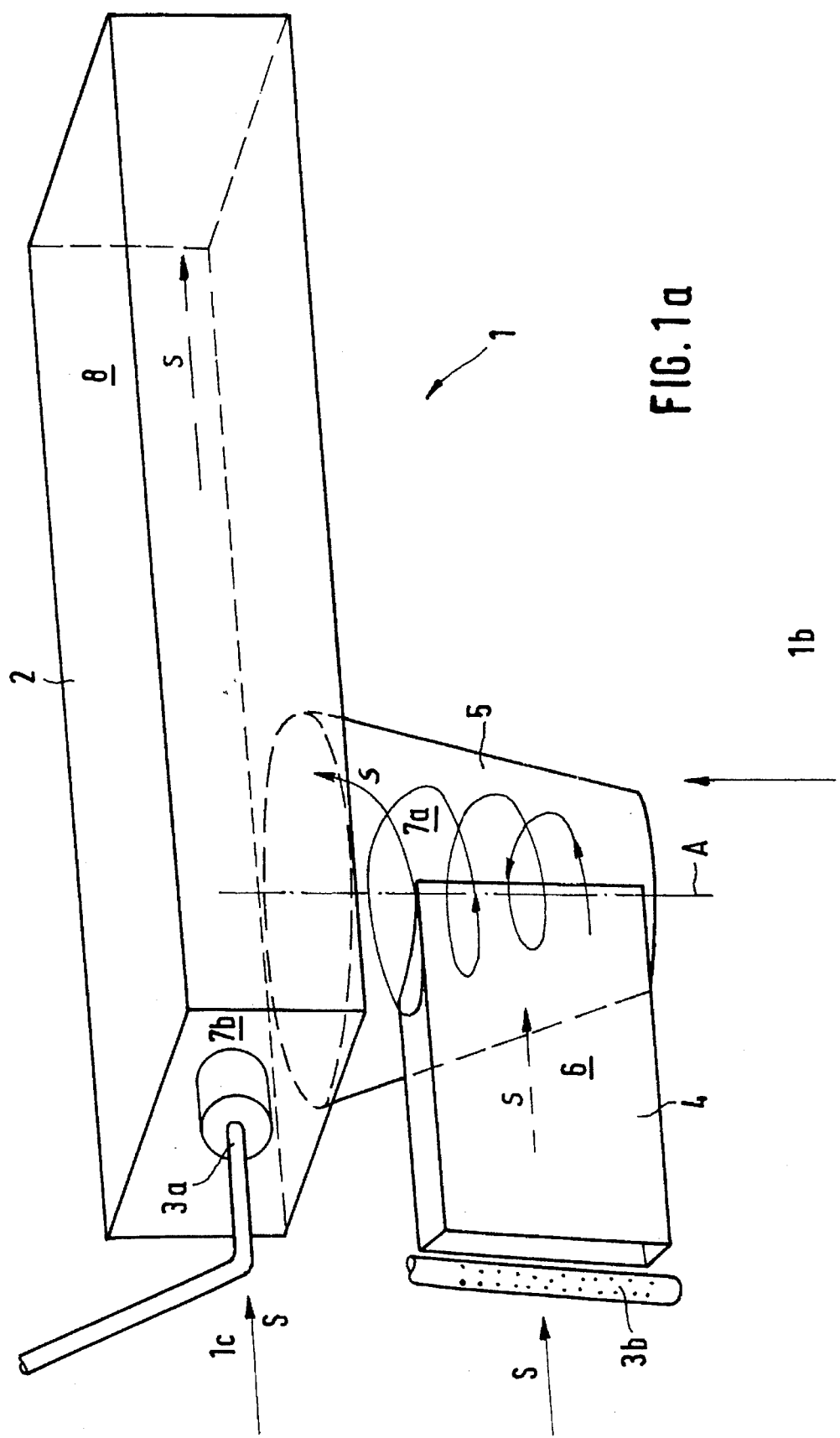
FIG. 1a is a perspective view schematically illustrating a first embodiment of a combustion chamber apparatus according to the present invention.
Figure 1B:
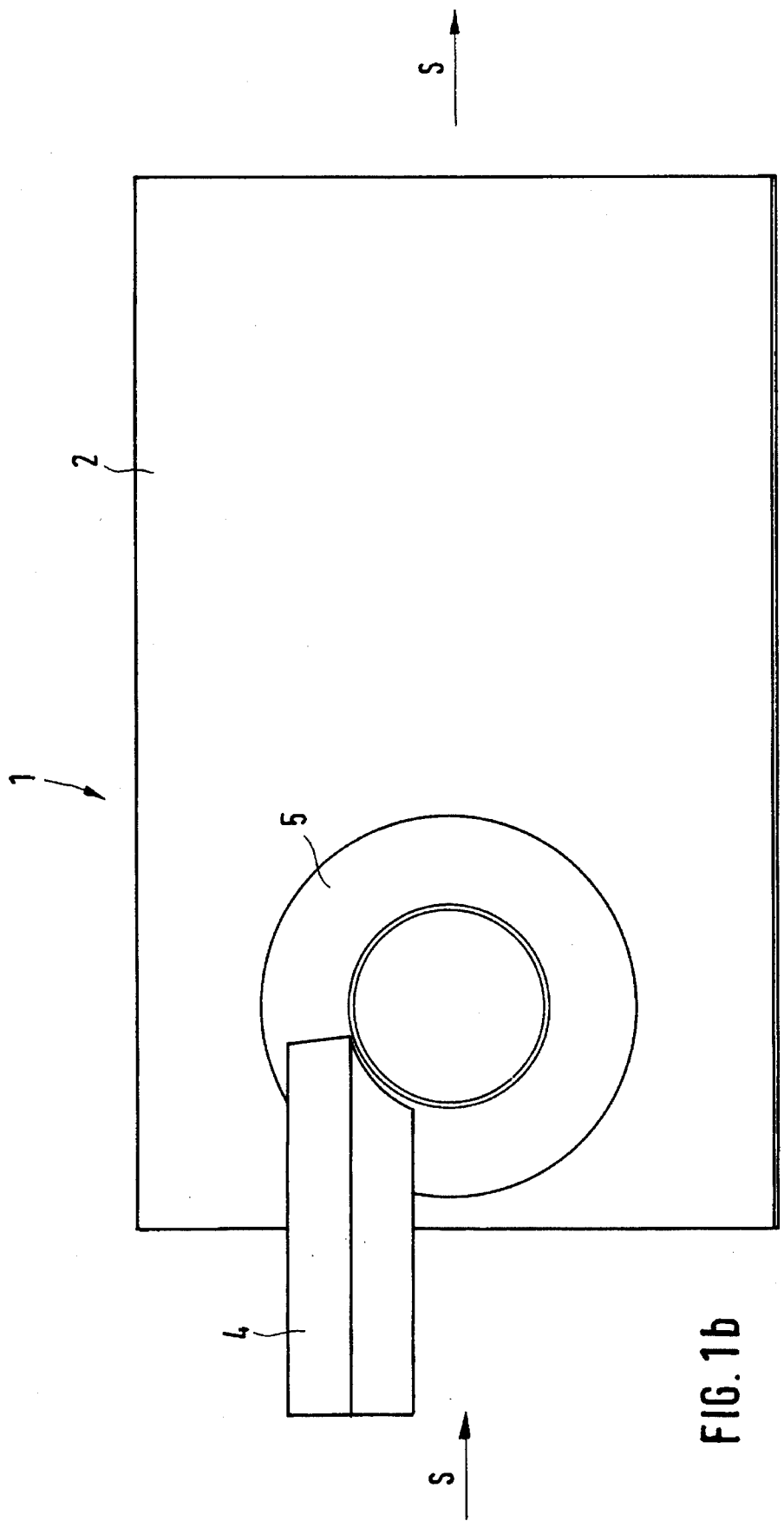
Figure 1C:
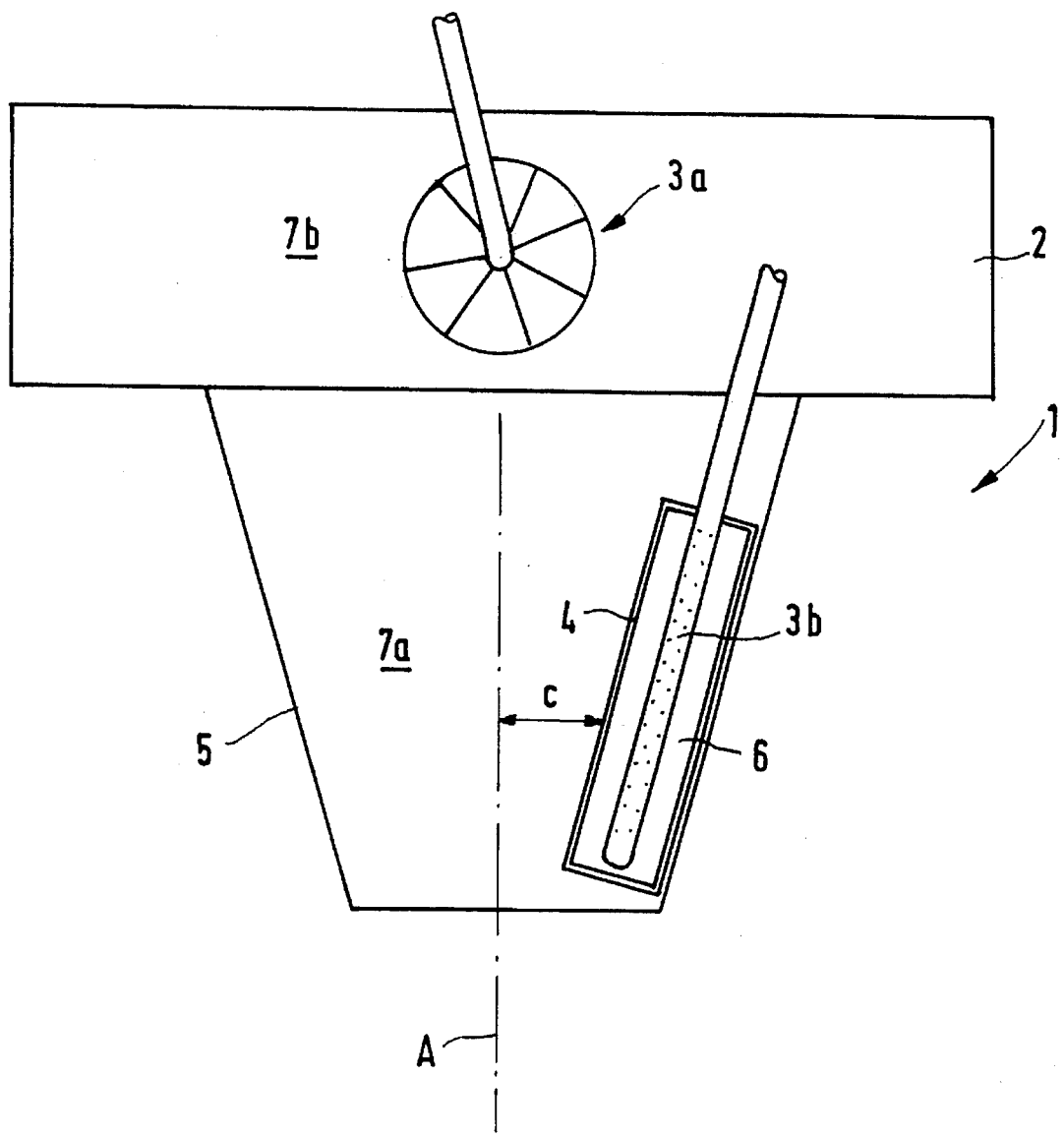

With reference now to FIG. 1a, therein is seen a combustion chamber apparatus 1 extending in the direction of flow S of a combustible fuel. The combustion chamber apparatus 1 is constructed as a lean-burn two-stage arrangement having a pilot stage and a main stage. The pilot stage, unlike the main stage, is operated at a high equivalence $\Phi$ of the fuel-air mixture, and comprises a flame tube 2 extending approximately parallel to the fuel injection means 3a at its upstream end. For premixing the fuel-air mixture and burning the same, the lean-burn main stage of the combustion chamber apparatus 1 includes two separately formed chambers 4,5. The chamber 4 is a vaporization chamber of rectilinear shape i.e. a parallelipiped, similar to the flame tube 2, and chamber 4 extends approximately parallel to the direction of flow S. Arranged at the upstream end of the vaporization chamber 4 is a second fuel injection means 3b. Vaporization of injected main stage fuel is of the droplet type and occurs in the primary vaporization zone 6 within the vaporization chamber 4 in a rectilinear flow path. As seen in FIGS. 1b and 1c the downstream end of the vaporization chamber 4 is connected eccentrically to the combustion chamber 5. The combustion chamber 5 encloses a primary combustion zone 7a and is of a flaring conical shape. The vaporization chamber 4 is positioned relative to the combustion chamber 5 such that the fuel-air mixture from vaporization chamber 4 enters the primary combustion zone 7a in a direction approximately tangential to and at a lateral distance c from the axis of symmetry A of the combustion chamber 5. This causes the flow in the primary combustion zone 7a to whirl about the axis of symmetry A, ensuring positional stability of the flame in the primary combustion zone 7a. For this purpose, the axis of symmetry A of the combustion chamber 5 is transverse to the direction of flow S and at its flared or larger diameter end, the combustion chamber 5 opens into flame tube 2 downstream of the first fuel injection means 3a. Starting from the area where the combustion chamber 5 opens into the flame tube 2 and in downstream extension of the flame tube 2 all the way to the downstream end, a common burn zone 8 is provided for combustion gases of the main and primary stages.

Figure 2A:
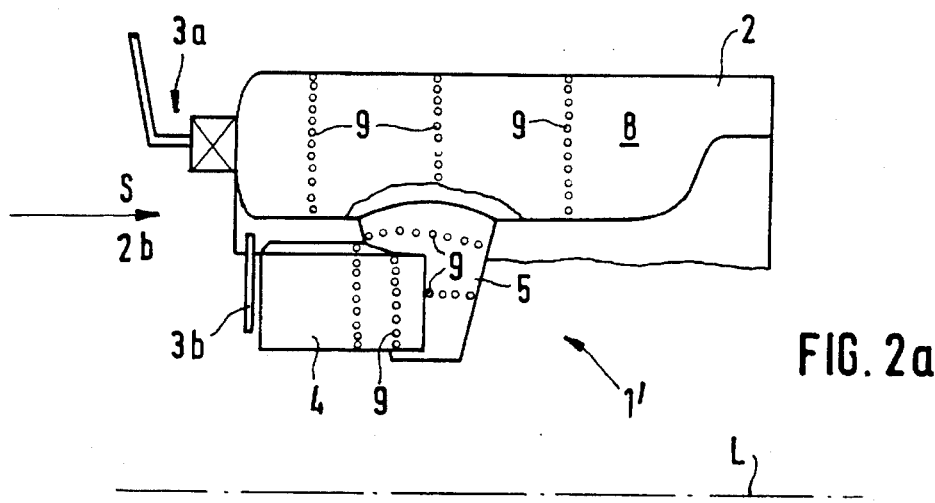
FIG. 2a is a diagrammatic, longitudinal section illustrating an embodiment of the combustion chamber apparatus in an annular form.
Figure 2B:
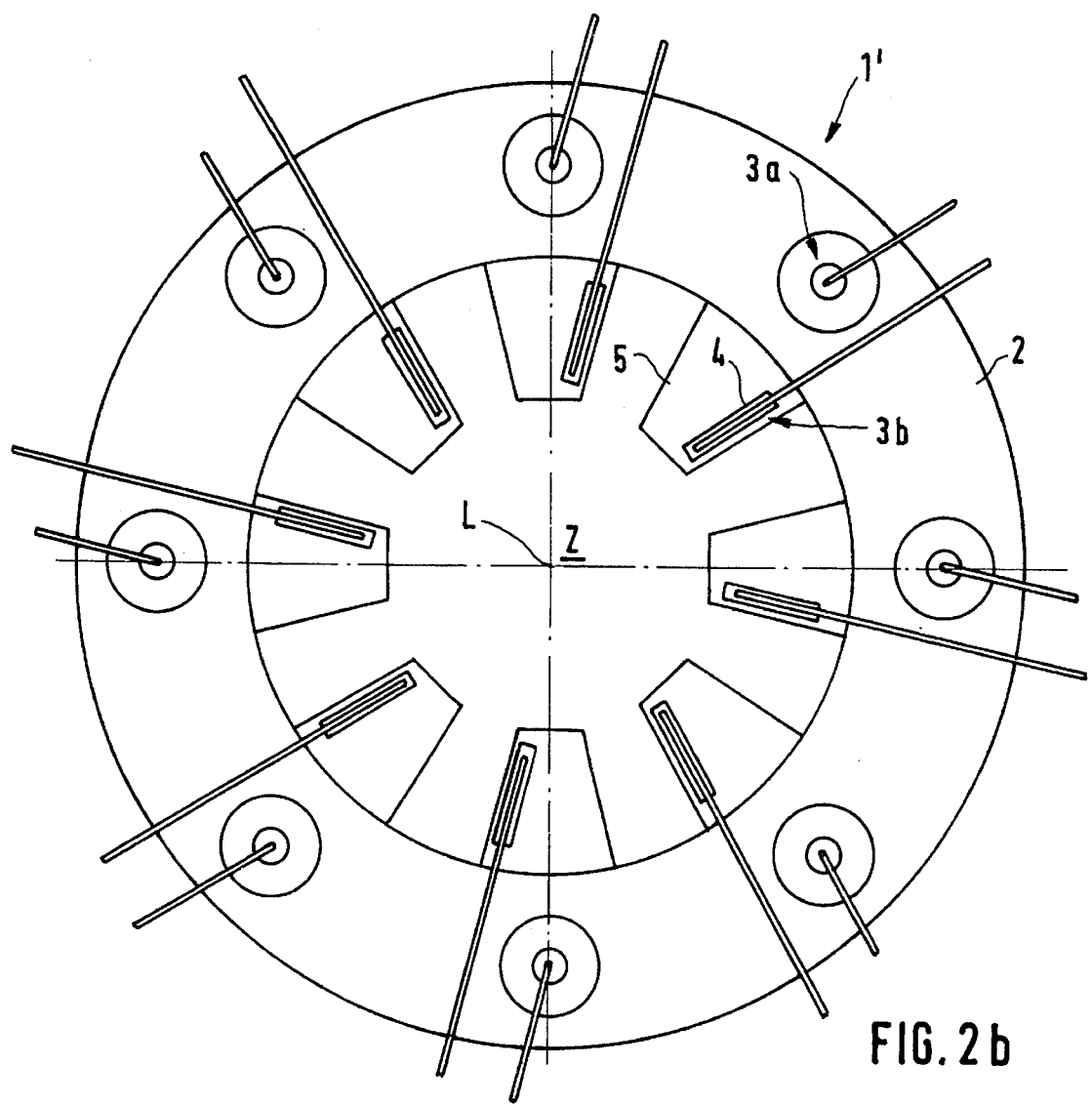

FIGS. 2a and 2b illustrate a combustion chamber apparatus 1' of annular configuration for a gas turbine (not shown). In the annular combustion chamber apparatus 1', the flame tube 2 is tubular and comprises a single ring-shaped flame tube or a plurality of tubes connected coaxially. When installed in a gas turbine, the longitudinal axis of the annular combustion chamber apparatus 1' extends coaxially in the gas turbine. The annular combustion chamber apparatus 1' is supplied at its injection end with air tapped from a compressor in the gas turbine engine. The fuel injection means 3a of flame tube 2 comprises equally angularly spaced first fuel injectors while the fuel injection means 3b of vaporization chamber 4 comprises equally angularly spaced second fuel injectors. The fuel injectors of fuel injector means 3a and 3b are in the form of atomizer nozzles. The primary, circumferentially undivided stages are each associated with first fuel injection means 3a. Accordingly, the annular combustion chamber apparatus 1' has a main stage for each pilot stage, where the combustion chambers 5 project radially towards the center Z of the annular combustion chamber apparatus 1'. For undisturbed inflow, the vaporization chambers 4 are aligned parallel to the longitudinal centerline L, i.e. in the direction of flow S. For cooling the walls of the flame tube 2 and the combustion and vaporization chambers 5 and 4, these are provided with air inlet ports 9.

When the annular combustion chamber apparatus 1' is used in aircraft gas turbine engines, the pilot and main stages can be operated alternately or concurrently to suit the flight condition or engine power setting, for which see FIG. 3, where the combustion temperature is plotted as a function of equivalence ratio $\Phi$ of the fuel-air mixture in main stage operation. For the main stage control range of the equivalence ratio $\Phi$ between 0.45 and 0.65, moderate nitrogen oxide formation is apparent at rated load. At off-design gas turbine load the pilot stage comes into operation, whose equivalence ratio $\Phi$ control range runs above that of the main stage.

Although the invention has been described in conjunction with specific embodiments thereof, it would become apparent to those skilled in the art that numerous modifications and variations can be made within the scope and spirit of the invention as defined in the attached claims.

What is claimed is:

1. Combustion chamber apparatus for a gas turbine comprising:

a flame tube for combustion of a fuel-air mixture, a first fuel injection means for supplying to the flame tube a fuel-air mixture which undergoes combustion in the flame tube, a first chamber forming a primary combustion zone, said first chamber being separate from and outside said flame tube, a second chamber forming a primary vaporization zone, said second chamber being outside said flame tube, and separate from said first chamber, and, a second fuel injection means for supplying a fuel-air mixture to said second chamber wherein primary vaporization takes place, said second chamber being connected to said first chamber to supply the latter with vaporized fuel-air mixture which undergoes primary combustion in said first chamber, said first chamber being connected to said flame tube downstream of said first fuel injection means to supply the flame tube with primary combustion products from said primary combustion zone, said first chamber having an axis and being symmetrical around said axis, said second chamber being connected eccentrically to said first chamber to produce a whirl of the fuel-air mixture in said first chamber around said axis.

2. Combustion chamber apparatus as claimed in claim 1, wherein said first chamber flares conically towards said flame tube.

3. Combustion chamber apparatus as claimed in claim 2, wherein said second chamber has an outlet which opens tangentially into said first chamber.

4. Combustion chamber apparatus as claimed in claim 1, wherein said second chamber is of rectilinear shape for substantially rectilinear flow of the fuel-air mixture therein.

5. Combustion chamber apparatus as claimed in claim 1, wherein said second chamber is shaped to provide substantially whirl-free flow of the mixture therein.

6. Combustion chamber apparatus as claimed in claim 1, wherein said flame tube and said second chamber extend substantially parallel to one another.

7. Combustion chamber apparatus as claimed in claim 1, wherein said second chamber has an upstream end remote from its connection to said first chamber, said second fuel injection means being disposed at said upstream end of said second chamber.

8. Combustion chamber apparatus as claimed in claim 1, wherein said second chamber has a wall provided with a plurality of circumferentially arranged air inlet ports for cooling purposes.

9. Combustion chamber apparatus for a gas turbine comprising:

a flame tube for combustion of a fuel-air mixture, a first fuel injection means for supplying to the flame tube a fuel-air mixture which undergoes combustion in the flame tube, a first chamber forming a primary combustion zone, said first chamber being separate from and outside said flame tube, a second chamber forming a primary vaporization zone, said second chamber being outside said flame tube, and separate from said first chamber, and, a second fuel injection means for supplying a fuel-air mixture to said second chamber wherein primary vaporization takes place, said second chamber being connected to said first chamber to supply the latter with vaporized fuel-air mixture which undergoes primary combustion in said first chamber, said first chamber being connected to said flame tube downstream of said first fuel injection means to supply the flame tube with primary combustion products from said primary combustion zone, said flame tube being of annular shape, said first and second chambers being present in a plurality of pairs arranged circumferentially around said flame tube.

10. Combustion chamber apparatus as claimed in claim 9, wherein said pairs of first and second chambers are equally spaced circumferentially around said flame tube.

11. Combustion chamber apparatus as claimed in claim 10, wherein said flame tube has inner and outer circumferential surfaces, said pairs of first and second tubes being disposed within said flame tube at the inner circumferential surface thereof, the first chambers of said pairs extending radially of said annular flame tube.

12. Combustion chamber apparatus as claimed in claim 1, wherein said first chamber has a length correlated to the velocity of flow of the fuel-air mixture in said second chamber to prevent spontaneous ignition of said mixture in said second chamber.

13. Combustion chamber apparatus as claimed in claim 1, wherein at least one of said first and second fuel injection means comprises an atomizer nozzle.

14. Combustion chamber apparatus as claimed in claim 1, wherein about ⅔ of the total air flow to the combustion chamber apparatus is supplied to the primary combustion zone of the first chamber and ⅓ of the air flow is supplied to the combustion zone of the flame tube.

15. Combustion chamber apparatus as claimed in claim 1, wherein about 25% of the total air flow to the combustion chamber apparatus is supplied to the combustion zone of the flame tube, about 55% to the primary combustion zone of the first chamber and 20% for cooling purposes.

16. Combustion chamber apparatus as claimed in claim 1, wherein said flame tube and said second chamber have longitudinal axes which are substantially parallel to one another, said first chamber having a longitudinal axis which is perpendicular to the longitudinal axes of the flame tube and said second chamber.

17. A method of combustion of fuel-air mixtures in combustion chamber apparatus for a gas turbine comprising:

vaporizing a lean fuel-air mixture in a vaporization chamber, supplying the vaporized fuel-air mixture to a separate combustion chamber, said combustion chamber being symmetrically formed around an axis, the vaporized fuel-air mixture being supplied eccentrically to said combustion chamber and thereby forming a rotational whirl of the fuel-air mixture in the combustion chamber around said axis, effecting combustion of the fuel-air mixture in the combustion chamber, supplying combustion products from the combustion chamber to a flame tube, supplying, through a fuel injection means, a second fuel-air mixture to the flame tube which is richer than the mixture supplied to the combustion chamber, effecting combustion of the second fuel-air mixture in the flame tube in a pilot stage, and effecting combustion in said flame tube, in a secondary combustion zone therein of the combustion products of the pilot stage and of the combustion chamber, the combustion products from the combustion chamber being supplied to said secondary combustion zone of said flame tube downstream of said fuel injection means in the flame tube.

18. A method as claimed in claim 17, comprising supplying the fuel-air mixture to the vaporization chamber to cause the mixture to flow substantially rectilinearly therein towards said combustion chamber and eccentrically into said combustion chamber.

19. A method of combustion of fuel-air mixtures in combustion chamber apparatus for a gas turbine comprising:

vaporizing a lean fuel-air mixture in a vaporization chamber, supplying the vaporized fuel-air mixture to a separate combustion chamber, effecting combustion of the fuel-air mixture in the combustion chamber, supplying combustion products from the combustion chamber to a flame tube, supplying, through a fuel injection means, a second fuel-air mixture to the flame tube which is richer than the mixture supplied to the combustion chamber, effecting combustion of the second fuel-air mixture in the flame tube in a pilot stage, and effecting combustion in said flame tube, in a secondary combustion zone therein of the combustion products of the pilot stage and the combustion chamber, the combustion products from the combustion chamber being supplied to said secondary combustion zone of said flame tube downstream of said fuel injection means in the flame tube, and wherein said flame tube has an annular shape, said method further comprising:

arranging said vaporization chamber and said combustion chamber in a plurality of pairs disposed circumferentially around the flame tube to supply combusted products from the combustion chambers of said plurality of pairs to said flame tube around the circumference thereof.

20. A method as claimed in claim 19, comprising forming the vaporization chambers of said pairs with a rectangular cross-section and arranging the combustion chambers of the pairs radially of the flame tube.

21. A method as claimed in claim 20, wherein one said fuel injection means and one corresponding said pilot stage are provided for each respective pair of vaporization and combustion chambers.

* * * * *